United States Patent Office 3,632,776
Patented Jan. 4, 1972

3,632,776
β,β'-DIACETOXY DIETHYL SELENIDE USEFUL AS A MITICIDE
Danford H. Olson, Littleton, Colo.
(R.R. 3, Edwardsville, Ill. 62025)
No Drawing. Original application Nov. 29, 1965, Ser. No. 510,399. Divided and this application Sept. 20, 1968, Ser. No. 819,500
Int. Cl. A01n 9/24
U.S. Cl. 424—311  3 Claims

ABSTRACT OF THE DISCLOSURE

The present disclosure teaches the use of β,β'-diacetoxy diethyl selenide as a miticide.

---

The present application is a divisional of application Ser. No. 510,399, filed Nov. 29, 1965, now abandoned.

The present invention relates to preparation of seleno esters and to new seleno ester compounds. In particular, the invention relates to the preparation of compounds having the structural formula:

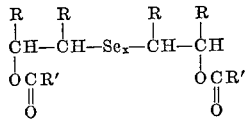

where R and R' are selected from the group consisting of hydrogen, monovalent hydrocarbon radicals, and substituted non-interfering (with the reactions of the present invention) monovalent hydrocarbon radicals, such as bromides, chlorides, and cyanides, and is preferably alkyl; where R' preferably has from 0 to about 20 and most preferably from 0 to about 6 carbon atoms; where the Rs and R's may be the same or different; and where $x$ is an integer of from 1 to about 6 and is preferably 1 or 2. Especially preferred are compounds in which R is hydrogen and the most preferred compound of the present invention is β,β'-diacetoxy diethyl selenide (DADS).

The compounds of the present invention are useful for a number of purposes including chemical intermediates, anti-oxidants and detergents in various oil and grease compositions. The most preferred compound of the invention, DADS, has been found to have unexpected utility as a contact miticide, exhibiting a 95% kill when a 0.35 g. sample is dissolved in 2 ml. acetone and dispersed in 100 ml. distilled water with 0.1 ml. Triton X–100 (an alkyl aryl polyether alcohol, surface-active agent incorporating wetting, detergency, emulsification, and dispersion properties) emulsifier and tested conventionally as a miticide. The preferred reaction for the preparation of the new compounds of the present invention is:

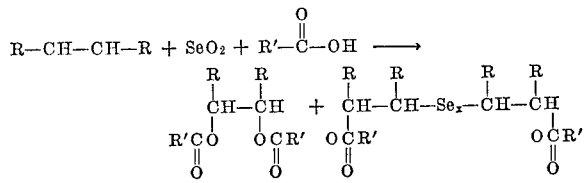

where R, R', and $x$ are as described above. In most cases at least some of the selenium charged will be recovered as selenium metal.

The preferred olefin starting materials for the present invention are the alkenes, especially ethylene and propylene with ethylene being most preferred. Mixtures of various olefins may be utilized as starting materials, but in most cases, pure olefins will be preferred.

The organic acid can be any strong organic acid including formic, acetic, propionic, butyric, duodecanoic, etc. The most preferred organic acid for the process of the present invention will be acetic acid, particularly glacial acetic acid. The selenium dioxide will preferably be suspended in the organic acid. Constant agitation of the reaction mixture is preferred.

Temperature is not narrowly critical, but is preferably from about 25 to about 350° F., more preferably from 75 to about 300° F. and most preferably from 200 to about 250° F. Similarly, pressure is not narrowly critical, but will preferably be from 0.1 to about 10,000 p.s.i.g. and most preferably from about 5 to about 50 p.s.i.g. The reaction may be conducted on a flow or preferably on a batch basis in conventional apparatus, e.g., a stirred autoclave. In the laboratory, the conventional Parr apparatus has been found to be convenient for the process of the present invention. Reaction media and catalysts, though not necessary to the practice of the invention, may be employed where desirable.

The miticidal activity of compounds of the present invention may be utilized by diluting the compounds with suitable insecticide diluents, e.g., kerosene, water plus emulsifiers, mineral spirits, and applying the composition to growing crops, e.g., food crops, ornamental shrubs, flowers, etc.

Mole ratios of starting materials are not narrowly critical, but a large excess of acetic acid is preferred to prevent the solution from becoming too viscous as the acetic acid is consumed. The optimum molar ratios will vary somewhat according to the starting materials and conditions employed, but may readily be determined by routine trial runs.

The following examples will serve to better illustrate the invention but should not be taken as limiting its scope. All of the apparent modifications and variations of the invention are intended to be included within the claims appended hereto.

EXAMPLE I

Glacial acetic acid (150 ml.) and selenium dioxide (26 g., 0.25 mole) are charged with 500 ml. Parr bottle which is then pressurized to 30 p.s.i.g. with ethylene from a pressure cylinder. The bottle is held in a conventional Parr reaction apparatus and heated slowly to 250° F. At about 100° F. a reaction commences slowly as indicated by a slow pressure drop. The reaction is stopped when no further absorption of ethylene occurs. The total ethylene absorbed by the reaction is approximately 2.7 g., 0.1 mole. The product mixture is filtered to remove selenium metal (11.95 g. recovered) and then poured into water. The aqueous solution is extracted several times with methylene chloride. The methylene chloride is washed with dilute aqueous NaHCO₃ to remove acetic acid, then dried over CaSO₄ and distilled. The products obtained are as follows: ethylene glycol diacetate, boiling point 35–36.5° C./0.15 mm., $n^{25}_D$ 1.4148, 4.9 g. (33.3% yield); β,β'-diacetoxy diethyl selenide, boiling point 92–102° C./0.25 mm. $n^{25}_D$ 1.4863, 8.13 g. (32.3%). (All yields are based on the moles of ethylene absorbed.) The structure of the β,β'-diacetoxy diethyl selenide is further confirmed by nuclear magnetic resonance, infrared spectroscopy, and elemental analysis all according to standard techniques. The results of the elemental analysis are as follows:

Calculated (percent): C, 37.96; H, 5.57; Se, 31.19.
Found (percent): C, 37.86; H, 5.70; Se, 30.87.

EXAMPLE II

Propylene is reacted with selenium dioxide and acetic acid as in Example I above. The reaction absorbs 19.7 g. propylene and the crude product weighs 36.05 g. after removal of the acetic acid. Distillation gives the following products which are recovered: allyl acetate, 0.55 g. boiling point, 90–100° C., $n^{25}_D$ 1.4031; a mixture of bis(acetoxypropyl) selenides, 25.05 g. boiling point 98–120° C. at 0.5 mm.; and low boiling products containing propylene glycol diacetate. The individual products are separated and recovered conventionally.

What is claimed is:

1. The process of controlling mites on growing crops which comprises applying a miticidal amount of $\beta,\beta'$-diacetoxydiethyl selenide diluted with a miticidal diluent to said crops.

2. A process according to claim 1 wherein the growing crops are selected from the class consisting of food crops, ornamental shrubs and flowers, and wherein said diluent is selected from the group consisting of acetone, kerosene, mineral spirits, and water plus emulsifiers.

3. The process of controlling mites which comprises contacting mites with a miticidal amount of $\beta,\beta'$-diacetoxydiethyl selenide.

References Cited

UNITED STATES PATENTS

| | | | |
|---|---|---|---|
| 2,398,414 | 4/1946 | Denison, Jr. et al. | 260—607 |
| 2,428,590 | 10/1947 | Shokal et al. | 260—497 |

FOREIGN PATENTS

| | | | |
|---|---|---|---|
| 1,105,414 | 4/1961 | Germany | 260—607 |

OTHER REFERENCES

Smedsland, Chem. Abs., vol. 26, 5905, 1932.
Olson, Chem. Abs., vol. 65, 2117, 1966.
Yarovenko et al., Chem. Abs., vol. 55, 20942, 1961.

ALBERT T. MEYERS, Primary Examiner

A. J. ROBINSON, Assistant Examiner

UNITED STATES PATENT OFFICE
CERTIFICATE OF CORRECTION

Patent No. 3,632,776       Dated    Jan. 4, 1972

Inventor(s)   Danford H. Olson

It is certified that error appears in the above-identified patent and that said Letters Patent are hereby corrected as shown below:

Col. 1, lines 20 and 21:   Delete in their entirety.

Col. 1, line 22:   Delete "the invention relates to the preparation of" and capitalize "compounds"

Col. 1, lines 30 and 31:   Delete: "selected from the group consisting of".

Col. 1, line 31:   "and" should read --or--

Col. 1, line 34:   "is" should read --are--

Signed and sealed this 4th day of July 1972.

(SEAL)
Attest:

EDWARD M. FLETCHER, JR.
Attesting Officer

ROBERT GOTTSCHALK
Commissioner of Patents